US012810637B2

(12) United States Patent
Guo et al.

(10) Patent No.: US 12,810,637 B2
(45) Date of Patent: Nov. 24, 2026

(54) SYSTEM AND METHOD WITH BIRD-EYE-VIEW SEGMENTATION WITH IMPROVED 3D OBJECT DETECTION

(71) Applicant: Robert Bosch GmbH, Stuttgart (DE)

(72) Inventors: Yuliang Guo, Redwood City, CA (US); Ruoyu Wang, Sunnyvale, CA (US); Cheng Zhao, Milpitas, CA (US); Xinyu Huang, San Jose, CA (US); Liu Ren, Saratoga, CA (US); Abhinav Kumar, East Lansing, MI (US)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 18/882,073

(22) Filed: Sep. 11, 2024

(65) Prior Publication Data

US 2026/0080697 A1 Mar. 19, 2026

(51) Int. Cl.

*G06V 20/70* (2022.01)
*B25J 9/16* (2006.01)
*G06V 10/82* (2022.01)

(52) U.S. Cl.

CPC ............ *G06V 20/70* (2022.01); *B25J 9/1697* (2013.01); *G06V 10/82* (2022.01)

(58) Field of Classification Search

CPC ........ G06V 20/70; G06V 10/82; G06V 20/56; B25J 9/1697

See application file for complete search history.

(56) References Cited

U.S. PATENT DOCUMENTS 11,500,099 B2 * 11/2022 Liang ...................... G01S 17/89
12,008,762 B2 * 6/2024 Agia ...................... G01S 17/42

(Continued)

FOREIGN PATENT DOCUMENTS

WO WO-2025093754 A1 * 5/2025 ............ G06V 20/56

OTHER PUBLICATIONS

Jiang, Qi, and Hao Sun. "SemanticBEVFusion: Rethinking LiDAR-Camera Fusion in Unified Bird's-Eye View Representation for 3D Object Detection." 2023 IEEE/RSJ International Conference on Intelligent Robots and Systems (IROS). IEEE, 2023. (Year: 2023).*

(Continued)

*Primary Examiner* — Utpal D Shah

(74) *Attorney, Agent, or Firm* — Kathy Takeguchi; Maginot, Moore & Beck LLP

(57) ABSTRACT

A computer-implemented method and system relate to improved object detection via a machine learning system, which includes at least an image encoder, a semantic segmentation head, and an object detection head. This machine learning system exhibits improved effectiveness in detecting relatively large objects. The image encoder generates image embedding data using at least one digital image. A bird's eye view (BEV) feature map is generated using the image embedding data. The semantic segmentation head generates semantic segmentation data using the BEV feature map. The object detection head generates three-dimensional (3D) box data for a detected object of the digital image based on the BEV feature map and the semantic segmentation data. The object detection head and the semantic segmentation head are jointly trained using a combined loss, which includes a first loss based on the BEV semantic segmentation data and a second loss based on the 3D box data.

20 Claims, 4 Drawing Sheets

(56) References Cited

U.S. PATENT DOCUMENTS

| | | | | |
|---|---|---|---|---|
| 12,646,292 | B2 * | 6/2026 | Park | G06V 10/7715 |
| 12,646,306 | B2 * | 6/2026 | Huang | G06V 10/7715 |
| 2022/0144260 | A1 * | 5/2022 | Chen | G06N 3/04 |
| 2023/0230385 | A1 * | 7/2023 | Tananaev | G06T 3/40 348/148 |
| 2023/0267615 | A1 * | 8/2023 | Agia | G01S 17/42 345/419 |
| 2025/0054286 | A1 * | 2/2025 | Huang | G06V 10/7715 |
| 2026/0105839 | A1 * | 4/2026 | Gupta | G06T 3/053 |

OTHER PUBLICATIONS

Chen, Xiaozhi, et al. "Monocular 3d object detection for autonomous driving." Proceedings of the IEEE conference on computer vision and pattern recognition. 2016. (Year: 2016).*

Kumar et al, "DEVIANT: Depth EquiVarlAnt NeTwork for Monocular 3D Object Detection", arXiv:2207.10758v1 [cs.CV] Jul. 21, 2022.

Li et al, BEVDepth: Acquisition of Reliable Depth for Multi-view 3D Object Detection, arXiv.2200.10092v2 [cs.CV] Nov. 30, 2022.

Li et al., "BEVFormer: Learning Bird's-Eye-View Representation from Multi-Camera Images via Spatiotemporal Transformers" arXiv. 2203.17270v2 [cs. CV] Jul. 13, 2022.

* cited by examiner

SYSTEM AND METHOD WITH BIRD-EYE-VIEW SEGMENTATION WITH IMPROVED 3D OBJECT DETECTION

GOVERNMENT RIGHTS

At least one or more portions of this invention may have been made with government support under U.S. Government Grant W911NF-18-1-0330, awarded by the Army Research Office (ARO). The U.S. Government may therefore have certain rights in this invention.

TECHNICAL FIELD

This disclosure relates generally to computer vision, and more particularly to digital image processing with semantic segmentation, object localization, and object detection.

BACKGROUND

Monocular 3D object detection is a task, which is used in many applications, such as autonomous driving and robotics. Monocular 3D object detection is challenging since objects of varying scales and depths may be projected such that they appear similar in an image. Although most monocular 3D detectors perform well on relatively non-large objects (e.g., cars) with respect to the frontal view, these monocular 3D detectors may experience performance drops with respect to larger objects (e.g., trailers, buses, trucks, etc.). Sometimes, these failures are attributed to a scarcity of training data or the receptive field requirements of these larger objects. Unfortunately, in some cases, such as autonomous driving, these failures may sometimes result in collisions or fatal accidents.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to improved object detection via a machine learning system. The machine learning system includes at least an image encoder, a semantic segmentation head, and an object detection head. The method includes generating, via the image encoder, image embedding data using at least one digital image. The method includes generating a bird's eye view (BEV) feature map using the image embedding data. The method includes generating, via the semantic segmentation head, semantic segmentation data using the BEV feature map. The method includes generating, via the object detection head, three-dimensional (3D) box data that identifies at least one detected object of the digital image based on the BEV feature map and the semantic segmentation data. The method includes finetuning the semantic segmentation head and the object detection head using a combined loss. The combined loss including first loss data based on the semantic segmentation data and second loss data based on the 3D box data.

According to at least one aspect, a system includes one or more processors and one or more computer memory. The one or more computer memory are in data communication with the one or more processors. The one or more computer memory have computer readable data stored thereon. The computer readable data includes instruction that, when executed by one or more processors, causes the one or more processors to perform a method. The method relates to improved object detection via a machine learning system. The machine learning system includes at least an image encoder, a semantic segmentation head, and an object detection head. The method includes generating, via the image encoder, image embedding data using at least one digital image. The method includes generating a BEV feature map using the image embedding data. The method includes generating, via the semantic segmentation head, semantic segmentation data using the BEV feature map. The method includes generating, via the object detection head, 3D box data that identifies at least one detected object of the digital image based on the BEV feature map and the semantic segmentation data. The method includes finetuning the semantic segmentation head and the object detection head using a combined loss. The combined loss including first loss data based on the semantic segmentation data and second loss data based on the 3D box data.

According to at least one aspect, one or more non-transitory computer readable mediums has computer readable data stored thereon. The computer readable data includes instructions that, when executed by one or more processors, cause the one or more processors to perform a method. The method relates to improved object detection via a machine learning system. The machine learning system includes at least an image encoder, a semantic segmentation head, and an object detection head. The method includes generating, via the image encoder, image embedding data using at least one digital image. The method includes generating a BEV feature map using the image embedding data. The method includes generating, via the semantic segmentation head, semantic segmentation data using the BEV feature map. The method includes generating, via the object detection head, 3D box data that identifies at least one detected object of the digital image based on the BEV feature map and the semantic segmentation data. The method includes finetuning the semantic segmentation head and the object detection head using a combined loss. The combined loss including first loss data based on the semantic segmentation data and second loss data based on the 3D box data.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
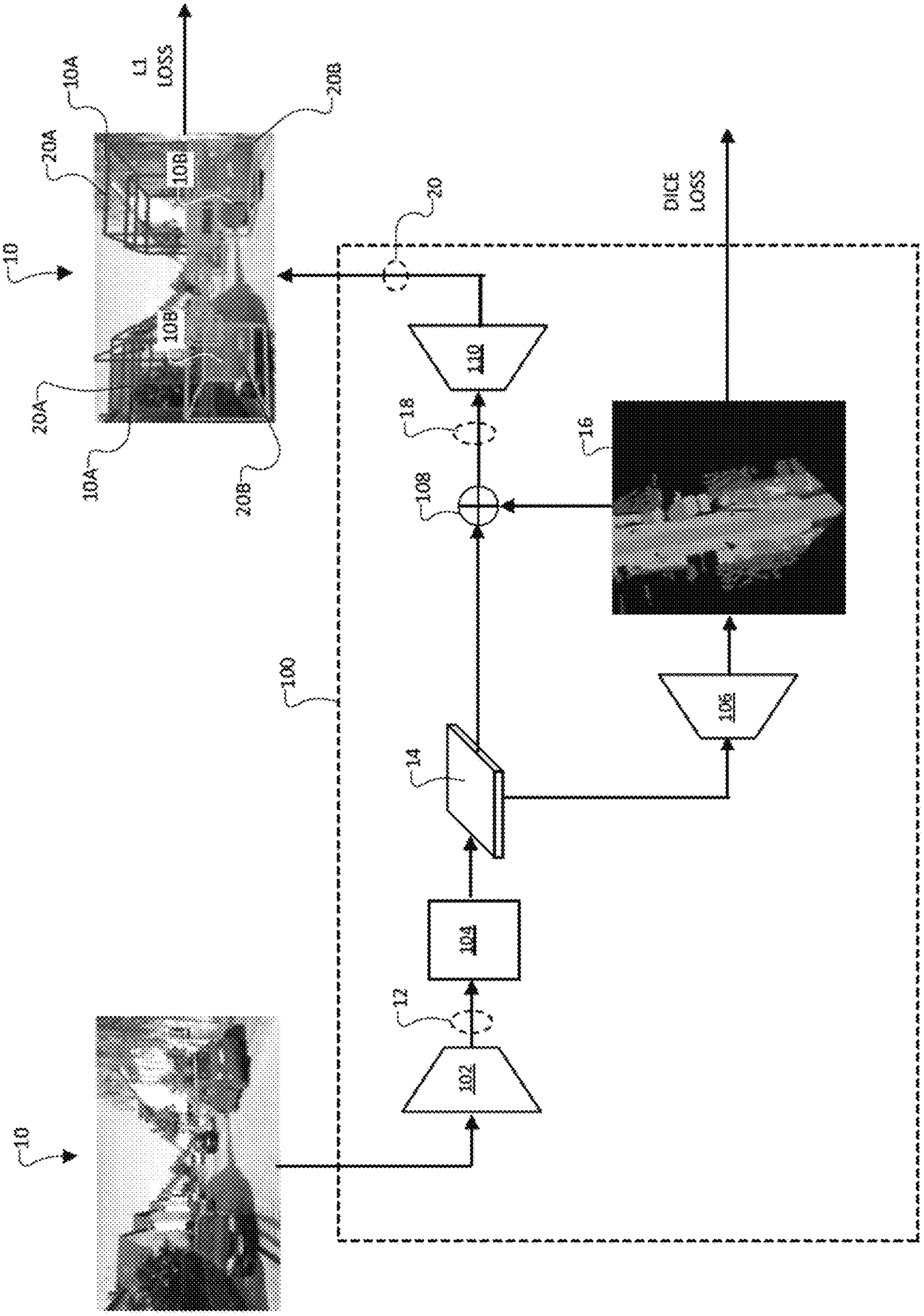
FIG. 1 is a flow diagram associated with an example of an architecture of a bird's eye view (BEV) system according to an example embodiment of this disclosure.
Figure 3:
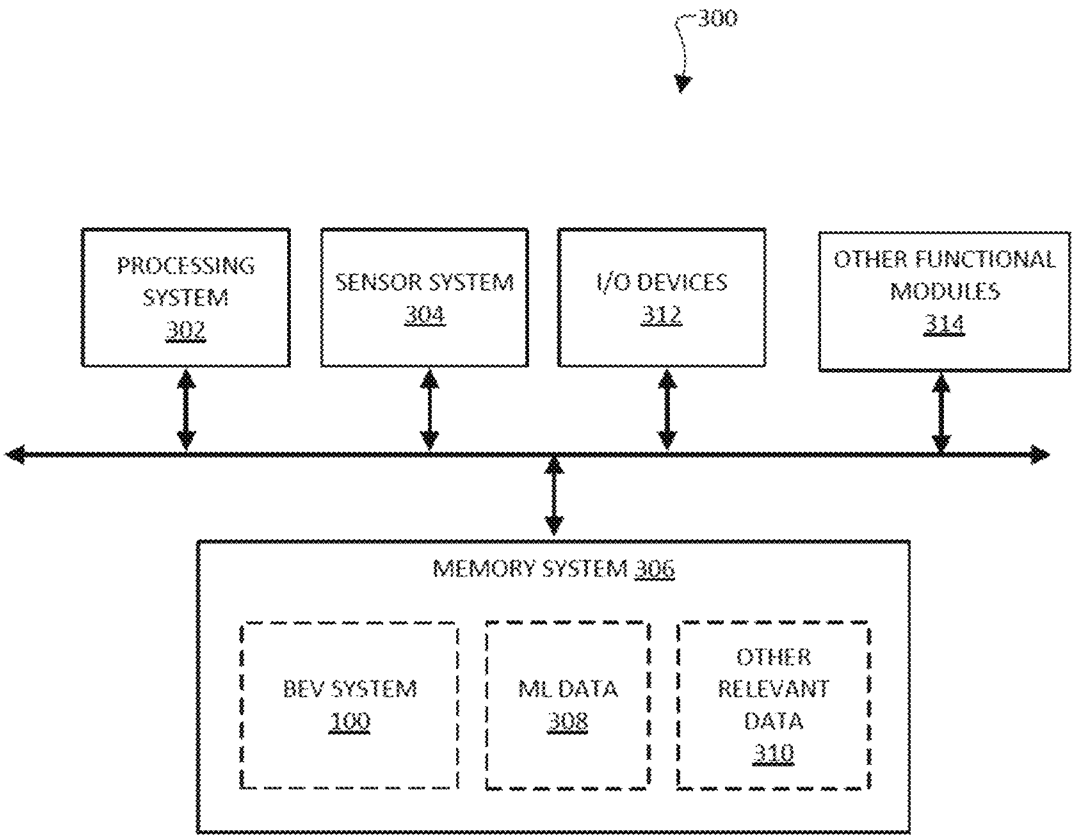
FIG. 3 is a diagram of an example of a system for training the BEV system according to an example embodiment of this disclosure.
Figure 4:
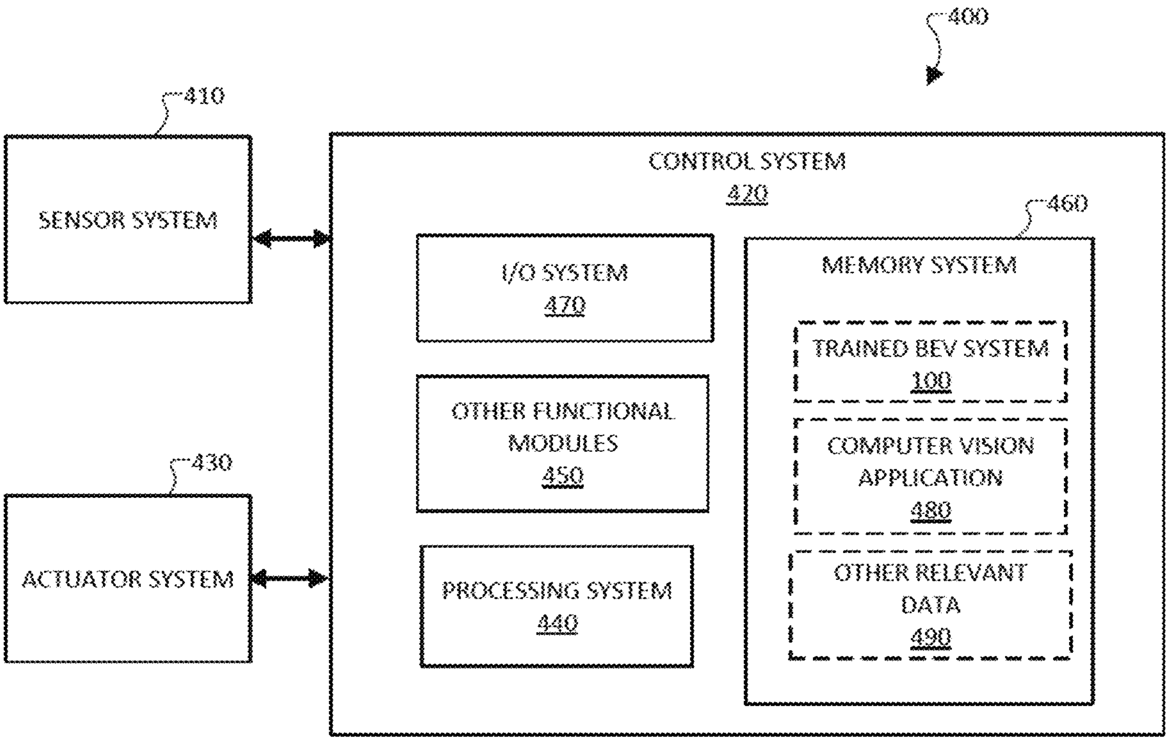
FIG. 4 is a diagram of an example of a system that includes the trained BEV system according to an example embodiment of this disclosure.

FIG. 1 illustrates a flow diagram of a process of a bird's eye view (BEV) segmentation and detection system (hereinafter "BEV system 100") for monocular 3D object detection (Mono3D). In general, Mono3D aims to estimate both the 3D positions and dimensions of objects in a scene from a single image or multiple images. This process is carried out by one or more processors (FIG. 3/FIG. 4). The BEV system 100 is configured to perform Mono3D for various objects. The BEV system 100 is advantageous, especially for providing improved Mono3D performance with respect to larger objects. As a non-limiting example, in the field of autonomous driving, for instance, "a large object" may refer to a bus, a trailer, a truck, or any foreground object having a length over 10 meters in the real world whereas "a non-large object" may refer to a car, a motorcycle, a bicycle, or any foreground object having a length less than 10 meters in the real world. In this regard, for instance, "a large object" may be a trailer having a length around 12 meters whereas a "non-large object" may be a car with a length of around 4 meters.

As an overview, the BEV system 100 provides a novel pipeline for improved 3D object detection based on a monocular camera. The BEV system 100 includes feeding BEV semantic segmentation data 16 (e.g., BEV semantic segmentation map) together with a BEV feature map 14 to the 3D object detection head 110. Based on this new process and corresponding architecture, the BEV system 100 is trained with a new training procedure, which includes (i) training the BEV semantic segmentation head 106 with Dice loss, and then (ii) jointly training the BEV semantic segmentation head 106 and the 3D object detection head 110 with a combined loss that includes the Dice loss and bounding box regression loss. To effectively involve the Dice loss, which is designed for segmentation tasks, to assist with Mono3D, the BEV system 100 treats the BEV semantic segmentation head 106 for foreground objects and the 3D object detection head 110 sequentially to increase Mono3D performance for large objects. The BEV system 100 is driven by a deep understanding of the distinctions between monocular regression and BEV segmentation losses.

Referring to FIG. 1, the BEV system 100 receives at least one digital image 10 as input data. The BEV system 100 also receives camera position and intrinsic parameters, which are associated with each digital image 10. The BEV system 100 builds upon a BEV-based framework by flexibly accepting single/multi-camera images. For example, the digital image 10 is received from a sensor system, which includes a monocular camera. The digital image 10 is a two-dimensional (2D) image. For instance, as a non-limiting example, in FIG. 1, the digital image 10 is a monocular camera image, which shows a frontal view of a scene. In FIG. 1, as a non-limiting example, the scene includes a row of houses 10A on a left side of a street and a row of houses 10A on the right side of the same street. In addition, the scene also shows some cars 10B that are parked on the left side of the street and some cars 10B parked on the right side of the street.

The BEV system 100 includes an image encoder 102, which is configured to receive the digital image 10. The image encoder 102 is configured to generate image features or image embedding data 12 using the digital image 10. As an example, the image encoder 102 may include a convolutional neural network (CNN), a residual neural network (ResNet), a vision transformer (ViT), or encoding technology that generates image embedding data.

After generating the image embedding data 12, the BEV system 100 includes a BEV converter 104, which transforms the image embedding data 12 into at least one BEV feature map 14. The BEV converter 104 includes software. More specifically, for example, the BEV converter 104 uses the camera position and intrinsic parameters to transform a current view (e.g., frontal view) of a scene of the digital image 10 to a BEV of the same scene of the digital image 10. The BEV converter 104 generates transformation data by transforming the current view (e.g., front view) to BEV for the scene of the digital image 10. The BEV converter 104 then applies this transformation data to the image embedding data to generate the BEV feature map 14. Next, as shown in FIG. 1, the BEV system 100 includes a sequential multi-head architecture, which receives and processes the BEV feature map 14. In particular, the BEV system 100 includes a BEV semantic segmentation head 106 and a 3D object detection head 110.

The BEV semantic segmentation head 106 is configured to predict semantic segmentation data 16 in the BEV space. As an example, the BEV semantic segmentation head 106 may comprise a CNN-based network comprising CNN layers. More specifically, as an example, the BEV semantic segmentation head 106 may be configured to predict BEV semantic segmentation data 16 of only foreground objects, as supervised by Dice loss. In this regard, the BEV semantic segmentation head 106 is configured to generate BEV semantic segmentation data 16 (e.g., BEV semantic segmentation map) using the BEV feature map 14. The BEV semantic segmentation data 16 provides depth information, which is considered to be a difficult Mono3D parameter to obtain. However, the BEV semantic segmentation data 16 lacks elevation and height information for an object of interest. To address this lack of elevation and height information for an object of interest, the BEV system 100 is configured to combine the BEV feature map 14 with the predicted BEV semantic segmentation data 16. More specifically, in this example, the BEV system 100 includes a concatenator 108, which is configured to generate concatenated data 18 by concatenating the BEV feature map 14 with respect to the BEV semantic segmentation data 16. For example, the concatenator 108 is configured to concatenate the BEV semantic segmentation data 16 as additional feature channels with respect to the BEV feature map 14.

In addition, the 3D object detection head 110 is configured to receive and process the concatenated data 18. As an example, the 3D object detection head 110 may comprise a CNN-based network comprising CNN layers. Also, the 3D object detection head 110 is configured to generate object bounding data in 3D using the concatenated data 18. Object bounding data is generated at least for each foreground object of the digital image 10. More specifically, as an example, for each object of interest, the 3D object detection head 110 is configured to predict 3D boxes in a 7-DoF representation: BEV 2D position, elevation, 3D dimension, and yaw. That is, instead of treating segmentation and detection branches in parallel, the BEV system 100 includes a sequential multi-head configuration that directly utilizes refined BEV localization information to enhance Mono3D.

Referring to FIG. 1, as a non-limiting example, the 3D object detection head 110 generates a set of 3D box data 20 that correspond to a set of objects of the digital image 10. More specifically, in FIG. 1, the 3D object detection head 110 generates a 3D box 20A for each house 10A and a 3D box 20B for each car 10B. In this case, the BEV system 100 is effective in identifying various objects, including relatively large objects (e.g., house 10A) and relatively non-large objects (e.g., car 10B). Each 3D box may encapsulate at least one detected object of interest. In this regard, the 3D object detection head 110 generates a 3D bounding box around one or more objects of the digital image 10 while also assigning a class label (e.g., house, car, etc.) that identifies them. The BEV system 100 is configured to transmit the 3D box data 20, corresponding to each detected object of interest, to a downstream computer vision application 480 (FIG. 4).

As discussed above, the BEV system 100 is configured to effectively provide 3D object detection with respect to various objects including large objects (e.g., objects that measure over 10 meters in length the real world). To do so, the BEV system 100 employs a two-stage training pipeline, which provides significant improvement in the localization accuracy of at least relatively large objects. More specifically, during a first stage, the BEV system 100 first trains the BEV semantic segmentation head 106 with Dice loss. The Dice Loss ("DL") includes at least a measure of similarity between the predicted segmentation and the true segmentation of a digital image. The Dice loss minimizes a difference between the predicted segmentation and the true segmentation. As an example, the BEV system 100 is configured to compute the Dice loss, as expressed in equation 1, where y represents the true segmentation (ground truth) of the image and where p represents the predicted segmentation of the digital image. In equation 1, a greater similarity between the true segmentation and the predicted segmentation generates a lower Dice Loss. In this regard, the performance of the BEV semantic segmentation head 106 is optimized by minimizing the Dice loss. In addition, by minimizing the Dice loss, this ensures that the BEV semantic segmentation head 106 is robust with respect to imbalanced datasets.

$$DL(y, \hat{p}) = 1 - \frac{2y\hat{p} + 1}{y + \hat{p} + 1} \quad [1]$$

Incorporating Dice loss in object detection introduces unique challenges. Firstly, Dice loss does not apply to sparse detection centers and only incorporates depth information when used in the BEV space. Secondly, naive joint training of Mono3D and BEV segmentation tasks with image inputs does not always benefit Mono3D task due to negative transfer, and the underlying reasons remain unclear. Fortunately, with respect to the BEV system 100, the 3D object detection head 110 can readily benefit from the BEV semantic segmentation head 106 being in the same BEV space. Also, to mitigate negative transfer, the BEV semantic segmentation head 106 is trained on the foreground detection categories.

As aforementioned, in the first stage, the BEV system 100 trains the BEV semantic segmentation head 106 with Dice loss. More specifically, the BEV system 100 employs the Dice loss between the predicted BEV semantic segmentation data 16 and the GT BEV semantic segmentation data, thereby fully utilizing Dice loss for noise-robustness and superior convergence in localizing large objects. Subsequently, in the second stage, the BEV system 100 jointly finetunes the BEV semantic segmentation head 106 and the 3D object detection head 110. Alternatively, the BEV system 100 may jointly finetune the image encoder 102, the BEV semantic segmentation head 106, and the 3D object detection head 110. More specifically, as an example, the BEV system 100 performs joint training on the BEV semantic segmentation head 106 and the 3D object detection head 110 with a combined loss (equation 3), which is a weighted combination of the Dice loss (equation 1) and the L1 loss (equation 2).

L1 loss is also known as Mean Absolute Error (MAE) loss and is expressed in equation 2. L1 loss is a loss function used in regression to calculate the average absolute differences between predicted values (e.g., predicted 3D box data) from the 3D object detection head 110 and the actual target values (e.g., GT 3D box data). MAE treats all errors with equal weight regardless of their magnitude. More specifically, in equation 2, $y_i$ represents the prediction and $x_i$ represents the true value (ground truth).

$$L1 \text{ Loss} = \frac{1}{n} \cdot \left( \sum_{i=1}^{n} |y_i - x_i| \right) \quad [2]$$

Referring to equation 3, the combined loss is expressed as a weighted sum of the Dice loss (equation 1) and the L1 loss (equation 2), where $\lambda_{seg}$ represents a weight associated with $L_{seg}$ in the baseline. More specifically, in equation 3, $L_{seg}$ represents the Dice loss (equation 1), which is based on a loss relating to semantic segmentation, and $L_{det}$ represents the L1 loss or the MAE loss (equation 2) relating to the object detection (e.g., 3D box data). Also, as a non-limiting example, $\lambda_{seg}$=5. As another non-limiting example, if the segmentation loss is itself scaled such as PanopticBEV (PBEV) with the $L_{seg}$ as 7, then $\lambda_{seg}$=35 may be used for object detection.

$$\text{Combined Loss} = L_{det} + \lambda_{seg} L_{seg}, \quad [3]$$

$$\text{where } L_{det} = L1 \text{ Loss},$$

$$L_{seg} = DL(y, \hat{p}), \text{ and}$$

$$\lambda_{seg} = \text{weight of } L_{seg} \text{ in the basline}$$

This particular two-stage training procedure benefits from the power of Dice loss in handling large-sized objects, and thus improves the overall 3D object detection performance. In this regard, the two-stage training paradigm includes (i) a first stage that includes training the BEV semantic segmentation head 106 with Dice loss and (ii) a second stage that includes training at least the 3D object detection head 110 with the combined loss to recover 3D boxes. The second stage also includes training the BEV semantic segmentation head 106 with the combined loss. Also, in another example embodiment, the second stage may include training the 3D object detection head 110, the BEV semantic segmentation head 106, and the image encoder 102 with the combined loss.

As discussed above and shown in FIG. 1, the BEV system 100 provides an effective pipeline for enhancing Mono3D of large objects. The BEV system 100 employs a sequential approach that involves the BEV semantic segmentation head 106 and the 3D object detection head 110. More specifically, the BEV system 100 first utilizes the BEV semantic segmentation head 106 to predict the segmentation of only foreground objects, supervised by the Dice Loss. Also, the BEV system 100 is trained with Dice Loss, which offers superior noise-robustness for large objects, ensuring stable convergence, while focusing on the foreground objects in segmentation mitigates negative transfer. Subsequently, the BEV system 100 concatenates the resulting BEV semantic segmentation data 16 (e.g., BEV semantic segmentation map) with the BEV feature map 14 as one or more additional feature channels. The BEV system 100 feeds this concatenated feature to a 3D object detection head 110. In this regard, with respect to the BEV system 100, only the 3D object detection head 110 predicts some additional 3D attributes, namely object's height and elevation.

The BEV system 100 is trained via a two-stage training pipeline. The first stage exclusively focuses on training the BEV semantic segmentation head 106 with Dice loss, which fully exploits its noise-robustness and superior convergence in localizing large objects. The second stage involves a combination of the Dice loss and regression loss (e.g., L1 loss) to finetune the BEV semantic segmentation head 106 and the 3D object detection head 110. Alternatively, in another example, the second stage involves training the 3D object detection head 110, the BEV semantic segmentation head 106, and the image encoder with the combined loss. The BEV system 100 was developed by comprehensively investigating regression losses and Dice losses, examining their robustness under varying error levels and object sizes.

Figure 2A:
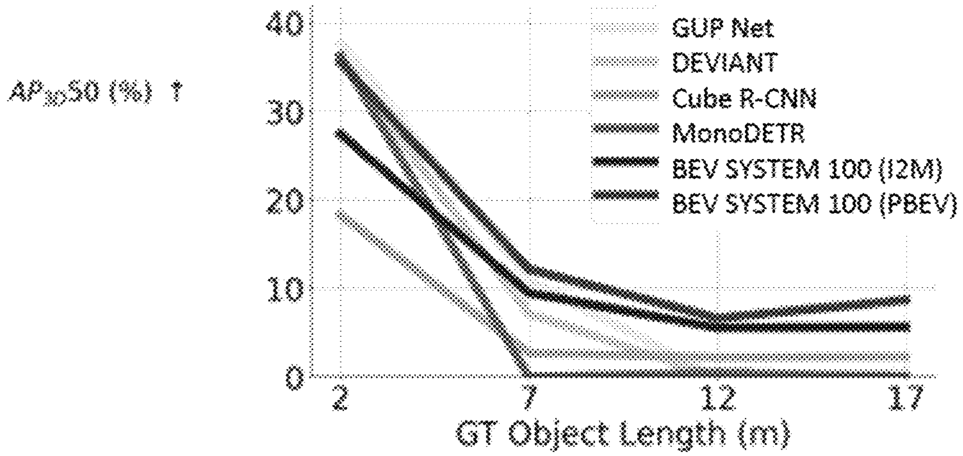
FIG. 2A and FIG. 2B are graphs that show the BEV system outperforming other detectors for larger objects according to an example embodiment of this disclosure.
Figure 2B:
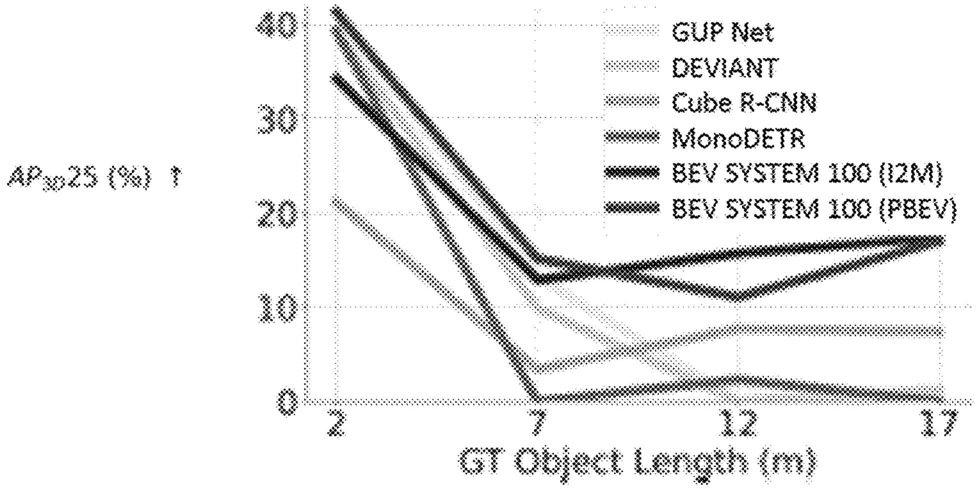

FIG. 2A and FIG. 2B are graphs, which compares the performances of the BEV system 100 in relation to the performances of other frontal 3D object detectors. In FIG. 2A and FIG. 2B, the other frontal detectors include GUP Net, DEVIANT, Cube R-CNN, and MonoDETR. Also, FIG. 2A and FIG. 2B includes references to two image-to-BEV segmentation methods: Image2Maps (I2M) and PanopticBEV (PBEV). In this regard, since the BEV system 100 is built upon BEV segmentation, the BEV system 100 may flexibly incorporate another BEV segmentation method (e.g., I2M and PBEV) as a part of its pipeline by connecting them with an object detection head 110 and applying the herein disclosed specific two-stage training strategies. More specifically, the first example of the BEV system 100 uses I2M parts (i.e., image encoder, the image-to-BEV transform, and the segmentation head) and another detection head (e.g., Box Net) with the novel two-stage training of the BEV system 100. Also, in FIG. 2A and FIG. 2B, the second example of the BEV system 100 uses PBEV parts (e.g., the image encoder, the image-to-BEV transform, and the segmentation head) and another detection head (e.g., Box Net) with the novel two-stage training of the BEV system 100. As shown in FIG. 2A and FIG. 2B, these two versions of the BEV system 100 outperform the other frontal 3D object detectors.

Each graph includes a (i) y-axis that shows the lengthwise average precision ($AP_{3D}$) analysis and (ii) an x-axis that shows the object length in meters. The performance of each of the frontal detectors and the BEV systems 100 is based on the KITTI-360 dataset. In this regard, the KITTI-360 dataset uses mean AP percentage across categories to benchmark models. More specifically, for bounding box detection, the performance is evaluated with mean $AP_{3D}$ at a threshold of 0.5 ("$AP_{3D}$50(%)") in FIG. 2A and evaluated with mean $AP_{3D}$ at a threshold of 0.25 ("$AP_{3D}$ 25(%)") in FIG. 2B. For these performance evaluations, KITTI-360 is used as the dataset at least since KITTI-360 includes large objects while also exhibiting a balanced distribution of (i) large objects and (ii) cars. In this regard, FIG. 2A and FIG. 2B show that the pipelines with the BEV system 100 outperform all baselines on relatively "larger" objects, which are sized to be over 10 m in length. In addition, FIG. 2A and FIG. 2B show that the pipelines with the BEV system 100 excel for large objects, where the baselines' performance drops significantly.

FIG. 3 is a block diagram of an example of a system 300 that includes the BEV system 100, which is configured to generate a set of 3D object detection data (e.g., 3D box data and corresponding class data for an object of interest) for a set of objects of at least one digital image, according to an example embodiment. The system 300 is configured to perform the process of FIG. 1. The system 300 includes at least a processing system 302. The processing system 302 includes at least one processing device. For example, the processing system 302 may include an electronic processor, a central processing unit (CPU), a graphics processing unit (GPU), a tensor processing unit (TPU), a microprocessor, a field-programmable gate array (FPGA), an application-specific integrated circuit (ASIC), any processing technology, or any number and combination thereof. The processing system 302 is operable to provide the functionality of the BEV system 100 as described in this disclosure.

The system 300 includes at least one sensor system 304. The sensor system 304 includes one or more sensors. For example, the sensor system 304 includes at least an image sensor, such as a monocular camera that is configured to generate at least one digital image (e.g., digital image 10). The sensor system 304 may include at least one other type of sensor (e.g., radar, light detection and ranging (LIDAR), infrared, etc.) to obtain additional sensor data, whereby the sensor system 304 may generate digital images based on this additional sensor data. The sensor system 304 is operable to communicate with one or more other components (e.g., processing system 302 and memory system 306) of the system 300. For example, the sensor system 304 may provide sensor data (e.g., one or more digital images), which is then processed by the processing system 302. The sensor system 304 is local, remote, or a combination thereof (e.g., partly local and partly remote) with respect to one or more components of the system 300. Upon receiving the sensor data (e.g., one or more digital images), the processing system 302 is configured to process this sensor data (e.g., one or more digital images) in connection with the BEV system 100, the machine learning (ML) data 308, the other relevant data 310, or any number and combination thereof.

The system 300 includes a memory system 306, which is operatively connected to the processing system 302. In this regard, the processing system 302 is in data communication with the memory system 306. The memory system 306 includes at least one non-transitory computer readable storage medium, which is configured to store and provide access to various data to enable at least the processing system 302 to perform the operations and functionality, as disclosed herein. The memory system 306 comprises a single memory device or a plurality of memory devices. The memory system 306 may include electrical, electronic, magnetic, optical, semiconductor, electromagnetic, or any suitable storage technology. For instance, the memory system 306 may include random access memory (RAM), read only memory (ROM), flash memory, a disk drive, a memory card, an optical storage device, a magnetic storage device, a memory module, any suitable type of memory device, or any number and combination thereof.

The memory system 306 includes at least the BEV system 100, which is configured to generate object detection data (e.g., 3D bounding box data for an object) based on one or more digital images. The BEV system 100 includes computer readable data that, when executed by the processing system 302, is configured to perform at least the functions of the BEV system 100 as disclosed in this disclosure. The computer readable data may include instructions, code, routines, various related data, any software technology, or any number and combination thereof. For instance, in an example embodiment, the BEV system 100 includes a number of software technologies and a machine learning system. More specifically, in FIG. 1, the machine learning system includes at least the image encoder 102, the BEV semantic segmentation head 106, and the 3D object detection head 110. Also, in the example embodiment of FIG. 1, the software technologies (e.g., instructions, code, routines, programs, etc.) include the BEV converter 104, the concatenator 108, the two-stage training protocol, etc.

Also, the memory system 306 includes other relevant data 310, which provides various data (e.g., operating system, etc.) that enables the system 300 and/or the processing system 302 to perform the functions as discussed herein. In addition, the memory system 306 may include ML data 308 (e.g., machine learning training data, machine learning parameters, machine learning algorithms, etc.), which relates to the training, testing, deployment, employment, or any combination thereof with respect to the BEV system 100. The computer readable data may include instructions, code, routines, various related data, any software technology, or any number and combination thereof.

The system 300 may include one or more I/O devices 312 (e.g., display device, microphone, speaker, keyboard, etc.). As an example, for instance, the system 300 may include a display device, which is configured to display the 3D box data 20 and corresponding object class data, and/or other related data. In addition, the system 300 includes other functional modules 314, such as any appropriate hardware, software, or combination thereof that assist with or contribute to the functioning of the system 300 and/or the BEV system 100. For example, the other functional modules 314 include communication technology (e.g., wired communication technology, wireless communication technology, or a combination thereof) that enables components of the system 300 to communicate with at least each other. The communication technology may enable components of the system 300 to communicate with one or more other network connected communication/computer devices (not shown).

FIG. 4 is a diagram of a system 400, which includes the trained BEV system 100. The system 400 is configured to also include at least a sensor system 410, a control system 420, and an actuator system 430. The system 400 is configured such that the control system 420 controls the actuator system 430 based on sensor data from the sensor system 410. More specifically, the sensor system 410 includes one or more sensors and/or corresponding devices to generate sensor data. For example, the sensor system 410 includes at least an image sensor (e.g., a monocular camera). The sensor system 410 may also include a radar sensor, LIDAR, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 410 is operable to communicate with the control system 420 via an input/output (I/O) system 470 and/or other functional modules 450, which includes communication technology.

The control system 420 is configured to obtain the sensor data directly or indirectly from one or more sensors of the sensor system 410. In this regard, the sensor data may include sensor data from a single sensor or sensor-fusion data from a plurality of sensors. Upon receiving input, which includes at least sensor data, the control system 420 is operable to process the sensor data via the processing system 440. In this regard, the processing system 440 includes at least one processor. For example, the processing system 440 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 440 is configured to extract, generate, and/or obtain proper input data (e.g., a digital image) for the trained BEV system 100. In addition, the processing system 440 is operable to generate object detection data (e.g., 3D box data for an object of interest) via the trained BEV system 100 based on communications with the memory system 460. In addition, the processing system 440 is operable to provide actuator control data to the actuator system 430 based on the object detection data (e.g., 3D box data and corresponding class data).

The memory system 460 is a computer or electronic storage system, which is configured to store and provide access to various data to enable at least the operations and functionality, as disclosed herein. The memory system 460 comprises a single device or a plurality of devices. The memory system 460 includes electrical, electronic, magnetic, optical, semiconductor, electromagnetic, any suitable memory technology, or any combination thereof. For instance, the memory system 460 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 420 and/or processing system 440, the memory system 460 is local, remote, or a combination thereof (e.g., partly local and partly remote).

The memory system 460 includes at least the trained BEV system 100, which is executed via the processing system 440. The trained BEV system 100 is configured to receive or obtain input data, which includes a digital image. In this regard, the trained BEV system 100, via the processing system 440, is configured to generate object detection data (e.g., 3D box data, 3D box data and corresponding class data, etc.) as the output data based on the input data (e.g., one or more digital images).

Furthermore, as shown in FIG. 4, the system 400 includes other components that contribute to operation of the control system 420 in relation to the sensor system 410 and the actuator system 430. For example, as shown in FIG. 4, the memory system 460 is also configured to store other relevant data 490, which relates to the operation of the system 400 in relation to one or more components (e.g., sensor system 410, the actuator system 430, etc.). Also, as shown in FIG. 4, the control system 420 includes the I/O system 470, which includes one or more interfaces for one or more I/O devices that relate to the system 400. For example, the I/O system 470 provides at least one interface to the sensor system 410 and at least one interface to the actuator system 430. Also, the control system 420 is configured to provide other functional modules 450, such as any appropriate hardware technology, software technology, or any combination thereof that assist with and/or contribute to the functioning of the system 400. For example, the other functional modules 450 include an operating system and communication technology that enables components of the system 400 to communicate with each other as described herein. With at least the configuration discussed in the example of FIG. 4, the system 400 is applicable in various technologies.

Figure 5:
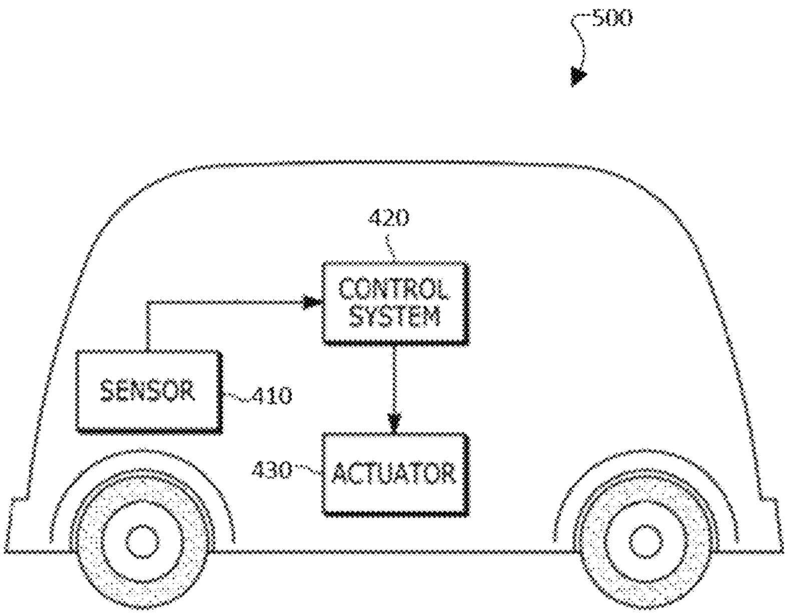
FIG. 5 is a diagram of an example of a vehicle that includes the trained BEV system according to an example embodiment of this disclosure.

FIG. 5 is a diagram of the system 400 with respect to mobile machine technology 500 according to an example embodiment. As a non-limiting example, the mobile machine technology 500 may include at least a partially autonomous vehicle, a robot, or the like. In FIG. 5, the mobile machine technology 500 is configured as vehicle, which is at least partially autonomous. The vehicle includes a number of systems including a sensor system 410, a control system 420, and an actuator system 430. More specifically, the sensor system 410 includes at least one image sensor (e.g., monocular camera). The sensory system 410 may further include an optical sensor, a video sensor, an ultrasonic sensor, a position sensor (e.g. GPS sensor), a radar sensor, a LIDAR sensor, any suitable sensing technology, or any number and combination thereof. One or more of the sensors may be integrated with respect to the vehicle. The sensor system 410 is configured to provide sensor data to the control system 420.

The control system 420 is configured to obtain image data, which is based on sensor data (i.e., a monocular camera) or sensor-fusion data from the sensor system 410. In addition, the control system 420 is configured to process the sensor data to provide input data of a suitable form (e.g., digital image) to the trained BEV system 100. In this regard, the trained BEV system 100 is advantageously configured to generate object detection data (e.g., 3D box data for an object of interest). In this regard, the trained BEV system 100 is advantageously configured generate object detection data for various sized objects with enhanced accuracy for "large" objects (e.g., objects greater than 10 meters in length such as trucks, buses, buildings, trailers, etc.).

Upon receiving the object detection data from the trained BEV system 100, the control system 420 is configured to generate actuator control data, which is based at least on object detection data in accordance with the computer vision application 480. By using the object detection data (e.g., 3D box data) of the trained BEV system 100, the control system 420 is configured to generate actuator control data that allows for safer and more accurate control of the actuator system 430 of the vehicle by at least by accurately detecting various objects, especially large objects. The actuator system 430 may include a braking system, a propulsion system, an engine, a drivetrain, a steering system, or any number and combination of actuators of the vehicle. The actuator system 430 is configured to control the vehicle so that the vehicle follows rules of the roads and avoids collisions based at least on the object detection data (e.g., 3D box data and corresponding class data), which is generated by the BEV system 100.

As described in this disclosure, the BEV system 100 provides a number of advantages and benefits. For example, the BEV system 100 includes a novel, two-stage pipeline, which significantly improves the localization accuracy of objects, especially large objects. This two-stage pipeline includes a sequential, multi-head architecture includes the BEV semantic segmentation head 106 and the 3D object detection head 110, which both receive the BEV feature map 14 as input data. The BEV semantic segmentation head 106 uses the BEV feature map 14 to generate the BEV semantic segmentation data 16 (e.g., the BEV semantic segmentation map). Also, the 3D object detection head 110 generates 3D box data using the BEV feature map 14 and the BEV semantic segmentation data 16.

The BEV system 100 is developed according to conjectures that the generalization issues with large objects stems not only from limited training data or larger receptive field, but also from the noise sensitivity of depth regression losses in Mono3D. Building upon these conjectures, the BEV system 100 adopts a novel two-stage training process. The first stage exclusively focuses on training the BEV semantic segmentation head 106 with Dice loss, as expressed in equation 1, which fully exploits its noise-robustness and superior convergence in localizing large objects. The second stage involves using a combined loss, which includes both the detection loss and Dice loss, as expressed in equation 3, to finetune the 3D object detection head 110 and the BEV semantic segmentation head 106. Alternatively, the second stage involves using the combined loss (equation 3) to train or finetune the image encoder 102, the BEV semantic segmentation head 106, and the object detection head 110. The BEV system 100 was developed based on the realization that that the cause of failure may be the sensitivity of depth regression losses to noises of larger objects. With a novel training method and sequential configuration, the BEV system 100 is driven by leveraging a deep understanding of the distinctions between monocular regression and BEV segmentation losses.

In addition, during the development of the BEV system 100, ablation studies were performed and showed that both Dice loss and BEV representation are significant to Mono3D of large objects. In particular, these studies reveal that replacing Dice loss with MSE loss or Smooth L1 loss reduces Mono3D performance. These studies also reveal that providing BEV segmentation (without Dice loss) reduces Mono3D performance.

Also, the BEV system 100 relates to Mono3D, which is highly accessible with respect to consumer vehicles compared to LIDAR/Radar-based detectors. Mono3D also offers greater computational efficiency compared to stereo-based detectors. Moreover, the BEV system 100 effectively integrates BEV segmentation with the Dice loss for Mono3D. The BEV system 100 shows an improvement in at least Mono3D with respect to larger objects (e.g., an object that measures over 10 meters in length in the real world), thereby contributing to greater accuracy and safety in various applications, such as autonomous vehicles, mobile robots, etc. Also, the BEV system 100 may be applied to various applications including autonomous driving, robotics, and augmented reality, which requires accurate 3D understanding of the environment.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method for object detection via a machine learning system, the method comprising:
receiving a digital image;
generating, via an image encoder, image embedding data using the digital image,
generating a bird's eye view (BEV) feature map using the image embedding data;
generating, via a semantic segmentation head, semantic segmentation data using the BEV feature map;
generating, via an object detection head, three-dimensional (3D) box data that identifies at least one detected object of the digital image based on the BEV feature map and the semantic segmentation data; and
fine-tuning the semantic segmentation head and the object detection head using a combined loss, the combined loss including first loss data based on the semantic segmentation data and second loss data based on the 3D box data,
wherein the machine learning system includes at least the image encoder, the semantic segmentation head, and the object detection head.

2. The computer-implemented method of claim 1, wherein:
the first loss data includes Dice loss;
the second loss data includes Mean Absolute Error (MAE) loss; and
the combined loss is a sum of the Dice loss and the MAE loss.

3. The computer-implemented method of claim 1, further comprising:
training the semantic segmentation head using Dice loss as the first loss,
wherein the semantic segmentation head is trained on the first loss before the semantic segmentation head and the object detection head is fine-tuned based on the combined loss.

4. The computer-implemented method of claim 1, further comprising:
generating transformation data by transforming a frontal view of objects of a scene of the digital image to BEV using camera position data and intrinsic parameter data associated with the digital image; and
applying the transformation data to the image embedding data to generate the BEV feature map.

5. The computer-implemented method of claim 1, wherein the semantic segmentation data is generated in the BEV space.

6. The computer-implemented method of claim 1, further comprising:
generating concatenated data by concatenating the BEV feature map and the semantic segmentation data,
wherein
the semantic segmentation data is concatenated as additional feature channels with respect to the BEV feature map, and
the object detection head generates the 3D box data using the concatenated data.

7. The computer-implemented method of claim 1, further comprising:
controlling an actuator based on the 3D box data for each object.

8. A system comprising:
one or more processors;
one or more computer memory in data communication with the one or more processors, the one or more computer memory having computer readable data stored thereon, the computer readable data including instruction that, when executed by one or more processors, causes the one or more processors to perform a method for object detection via a machine learning system, the method including
receiving a digital image;
generating, via an image encoder, image embedding data using the digital image,
generating a bird's eye view (BEV) feature map using the image embedding data;
generating, via a semantic segmentation head, semantic segmentation data using the BEV feature map;
generating, via an object detection head, three-dimensional (3D) box data that identifies at least one detected object of the digital image based on the BEV feature map and the semantic segmentation data; and
fine-tuning the semantic segmentation head and the object detection head using a combined loss, the combined loss including first loss data based on the semantic segmentation data and second loss data based on the 3D box data,
wherein the machine learning system includes at least the image encoder, the semantic segmentation head, and the object detection head.

9. The system of claim 8, wherein:
the first loss data includes Dice loss;
the second loss data includes Mean Absolute Error (MAE) loss; and
the combined loss is a sum of the Dice loss and the MAE loss.

10. The system of claim 8, further comprising:
training the semantic segmentation head using Dice loss as the first loss,
wherein the semantic segmentation head is trained on the first loss before the semantic segmentation head and the object detection head is fine-tuned based on the combined loss.

11. The system of claim 8, further comprising:
generating transformation data by transforming a frontal view of objects of a scene of the digital image to BEV using camera position data and intrinsic parameter data associated with the digital image; and
applying the transformation data to the image embedding data to generate the BEV feature map.

12. The system of claim 8, wherein the semantic segmentation data is generated in the BEV space.

13. The system of claim 8, generating concatenated data by concatenating the BEV feature map and the semantic segmentation data,
wherein
the semantic segmentation data is concatenated as additional feature channels with respect to the BEV feature map, and the object detection head generates the 3D box data using the concatenated data.

14. The system of claim 8, further comprising:

an actuator, wherein the actuator is controlled based on the 3D box data for each object.

15. One or more non-transitory computer readable mediums having computer readable data stored thereon, the computer readable data including instructions that, when executed by one or more processors, cause the one or more processors to perform a method for object detection via a machine learning system, the method comprising:

receiving a digital image;

generating, via an image encoder, image embedding data using the digital image, generating a bird's eye view (BEV) feature map using the image embedding data;

generating, via a semantic segmentation head, semantic segmentation data using the BEV feature map;

generating, via an object detection head, three-dimensional (3D) box data that identifies at least one detected object of the digital image based on the BEV feature map and the semantic segmentation data; and fine-tuning the semantic segmentation head and the object detection head using a combined loss, the combined loss including first loss data based on the semantic segmentation data and second loss data based on the 3D box data, wherein the machine learning system includes at least the image encoder, the semantic segmentation head, and the object detection head.

16. The one or more non-transitory computer readable mediums of claim 15, wherein:

the first loss data includes Dice loss;

the second loss data includes Mean Absolute Error (MAE) loss; and the combined loss is a sum of the Dice loss and the MAE loss.

17. The one or more non-transitory computer readable mediums of claim 15, further comprising:

training the semantic segmentation head using Dice loss as the first loss, wherein the semantic segmentation head is trained on the first loss before the semantic segmentation head and the object detection head is fine-tuned based on the combined loss.

18. The one or more non-transitory computer readable mediums of claim 15, further comprising:

generating transformation data by transforming a frontal view of objects of a scene of the digital image to BEV using camera position data and intrinsic parameter data associated with the digital image; and applying the transformation data to the image embedding data to generate the BEV feature map.

19. The one or more non-transitory computer readable mediums of claim 15, wherein the semantic segmentation data is generated in the BEV space.

20. The one or more non-transitory computer readable mediums of claim 15, further comprising:

generating concatenated data by concatenating the BEV feature map and the semantic segmentation data, wherein, the semantic segmentation data is concatenated as additional feature channels with respect to the BEV feature map, and the object detection head generates the 3D box data using the concatenated data.

* * * * *